United States Patent
Nakayama et al.

Patent Number: 6,122,765
Date of Patent: Sep. 19, 2000

[54] RECEIVING APPARATUS, RECEIVING METHOD, TRANSMISSION SYSTEM AND TRANSMISSION METHOD

[75] Inventors: Hirohumi Nakayama, Tokyo; Koichi Sawai, Yokohama, both of Japan

[73] Assignee: NTT Mobile Communications Network Inc., Tokyo, Japan

[21] Appl. No.: 08/827,174

[22] Filed: Mar. 27, 1997

[30] Foreign Application Priority Data

Mar. 27, 1996 [JP] Japan ................................. 8-072511

[51] Int. Cl.[7] .................................................. H04L 25/06
[52] U.S. Cl. .......................................... 714/774; 714/819
[58] Field of Search .......................... 371/67.1, 41, 37.2; 348/416; 386/120; 714/819, 774, 815, 814

[56] References Cited

U.S. PATENT DOCUMENTS

| | | | |
|---|---|---|---|
| 3,644,680 | 2/1972 | Amano et al. | 179/15 |
| 4,791,622 | 12/1988 | Clay et al. | 369/59 |
| 5,095,392 | 3/1992 | Shimazaki et al. | 360/40 |
| 5,589,885 | 12/1996 | Ooi | 348/416 |
| 5,659,654 | 8/1997 | Nagasawa et al. | 386/120 |

FOREIGN PATENT DOCUMENTS 0 428 427  5/1991  European Pat. Off. .

OTHER PUBLICATIONS

Kermant P et al., "Error Correction Schemes in a Mixed Voice/Data Environment" New Communication Services: A Challenge to Computer Technology. Proceedings of the International Conference on Computer Communication, Sep. 15, 1986, pp. 555–560, XP002057601.

*Primary Examiner*—Albert De Cady
*Assistant Examiner*—Esaw Abraham
*Attorney, Agent, or Firm*—Brinks Hofer Gilson & Lione

[57] ABSTRACT

Multiplex transmission apparatus 10 on the transmitting side multiplexes received signals from non-voice signal input output apparatus 14 and voice signal input output apparatus 16, and also transmits the multiplexed signal from communications network 30 by digital portable telephone 12 on the transmitting side. The digital portable telephone transmits a signal per 20 msec, so that multiplex transmission apparatus 10 alternately transmits the voice signal and the non-voice signal at an interval of 20 msec, for example. Multiplex transmission apparatus 20 sorts out the voice signal and the non-voice signal from the supplied signal by checking the error detecting code of the supplied signal. Multiplex transmission apparatus 20 can judge the type of the signal according to the type of the error detecting code, because a different error detecting code is added to each signal.

4 Claims, 6 Drawing Sheets

RECEIVING APPARATUS, RECEIVING METHOD, TRANSMISSION SYSTEM AND TRANSMISSION METHOD

BACKGROUND OF THE INVENTION

1. Field of the Invention

The present invention relates to a receiving apparatus, a receiving method, a transmission system and a transmission method which communicate by transmitting multiplexed digital signals of varying types.

2. Description of the Related Art

In the conventional art, there is available an apparatus which employs analog communications, such as an analog-type mobile telephone, to transmit signals of two or more varieties, such as a voice signal and electrocardiogram data. The apparatus transmits each signal by dividing the transmission band, while the receiving side employs an analog filter or the like to sort out each signal.

However, the analog filter cannot completely separate each signal, so that it may occur that one signal is included in other signal. Additionally, the analog communication system is susceptible to noises which are included on the transmission line or transmission channel, so that it becomes difficult to provide steady communications. On the other hand, a digital communication system, such as a portable telephone, a land-based mobile radiotelephone (i.e., cellular system), or the like is able to transmit only one type of signal per channel. Therefore, in the case of the digital communication system, it is necessary to provide a mobile apparatus for each type of signals in the case where two or more signals are transmitted at the same time. Accordingly, this requires that a plurality of mobile apparatuses be operated simultaneously.

SUMMARY OF THE INVENTION

It is accordingly a primary object of the present invention to provide a receiving apparatus, a receiving method, a transmission system and a transmission method that are able to resolve the aforementioned problems.

In an aspect of the present invention, there is provided a receiving apparatus which receives a signal from a communications network, said receiving apparatus consists of, a receiving means for receiving said signal from said communications network, an error control code type judgment means for judging the type of error control code which is added to said signal, and a first signal type judgment means for judging the type of said signal on the basis of said error control code.

Furthermore, in an aspect of the present invention, there is provided a receiving apparatus wherein said receiving apparatus further consists of a second signal type judgment means for judging the type of each signal subsequently received from said communications network on the basis of the receiving timing, which is determined by a receiving timing of said signal in which the type is judged by said first signal type judgment means, of each signal subsequently received.

Furthermore, in an aspect of the present invention, there is provided a data communication system which transmits the various types of signals from a transmission apparatus to a receiving apparatus, wherein said transmission apparatus further consists of;

an adding means for adding an error control code to each of said various types of signals according to the signal type, and a first transmission means for transmitting said various types of signals in which said error control code is added, wherein said receiving apparatus further consists of;

a receiving means for receiving said various types of signals, and a first signal type judgment means for judging the type of each of said various types of signals according to the error control code which is added to each of said various types of signals.

Furthermore, in an aspect of the present invention, there is provided a data communication system, wherein said transmission apparatus further consists of a second transmission means for transmitting said various types of signals at predetermined timing, and said receiving apparatus further consists of a second signal type judgment means for judging the type of each signal subsequently received from said communications network on the basis of the receiving timing, which is determined by a receiving timing of said signal in which the type is judged by said first signal type judgment means, of each signal subsequently received.

Furthermore, in an aspect of the present invention, there is provided a data receiving method comprising:

a step for receiving signals from communications network, a step for judging the type of an error control code which is added to said signals, and a step for judging the type of each of said signals on the basis of the type of said error control code.

Furthermore, in an aspect of the present invention, there is provided a data receiving method additionally having a step for judging the type of each signal subsequently received from said communications network on the basis of the receiving timing of said subsequently received signal.

Furthermore, in an aspect of the present invention, there is provided a data communication method which transmits the various types of signals from a transmission apparatus to a receiving apparatus, wherein said transmission apparatus further has a step for adding an error control code to each of the various types of signals according to the signal type, a step for transmitting the various types of signals in which said error control code is added, and wherein said receiving apparatus further has a judgment step for judging the type of each signal according to the error control code which is added to each of the various types of signals.

Furthermore, in an aspect of the present invention, there is provided a data communication method, wherein said transmission apparatus further has a step for transmitting said various types of signals at predetermined timing, and said receiving apparatus further has a step for judging the type of each signal subsequently received from said communications network, on the basis of the receiving timing, which is determined by a receiving timing of said signal in which the type is judged by said judgment step, of said subsequently received signal.

Therefore, in a receiving apparatus, a receiving method, a transmission system and a transmission method, it is possible to judge the type of the received signal based on the error detecting code which is added the received signal. Thus, it is possible to multiplex signals of a plurality of types using a simple digital line or digital channel.

BRIEF DESCRIPTION OF THE DRAWINGS

Further objects and advantages of the present invention will be apparent from the following description, reference being made to the accompanying drawings wherein preferred embodiments of the present invention are clearly shown. In the drawings.

DESCRIPTION OF THE PREFERRED EMBODIMENTS

An explanation will now be made of preferred embodiments of the present invention with reference to the figures.

A. First Embodiment

Figure 1:
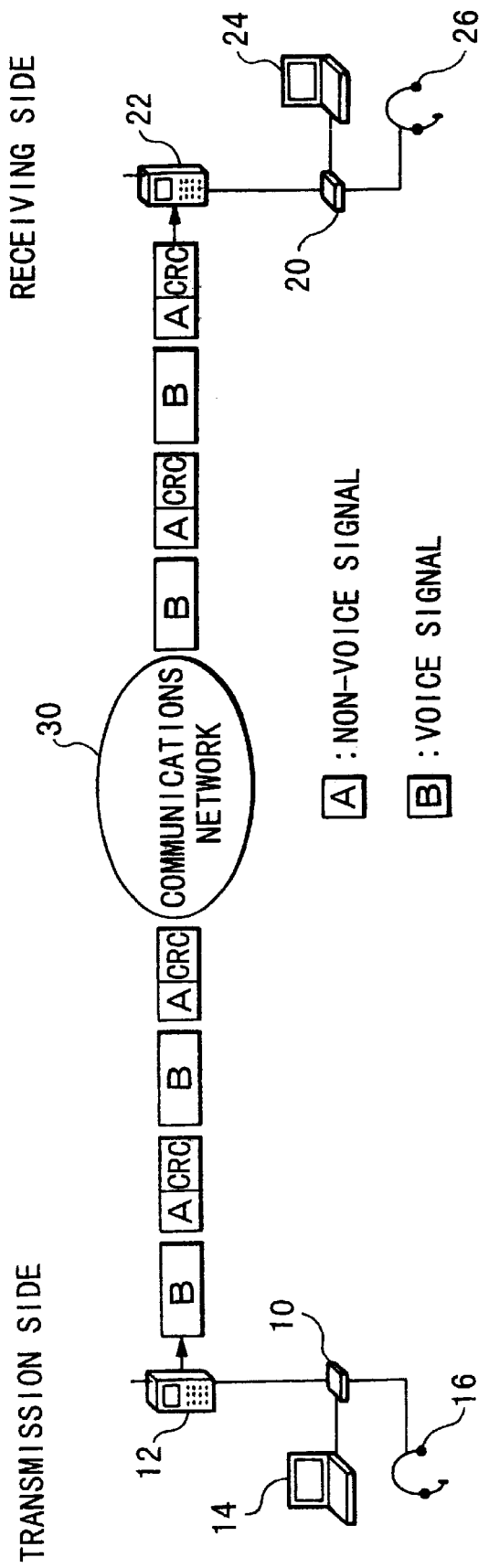
FIG. 1 is a conceptual diagram showing a structural example of a communication system according to an embodiment of the present invention.

FIG. 1 is a conceptual diagram showing a communication system which transmits a voice signal and a non-voice signal by using a digital portable telephone. Multiplex transmission apparatus 10 on the transmitting side multiplexes received signals from non-voice signal input output apparatus 14 and voice signal input output apparatus 16. Multiplex transmission apparatus 10 also transmits the multiplexed signal from communications network 30 by digital portable telephone 12 on the transmitting side. The maximum data transmission rate of the digital portable telephone is 11.2 kbps. In a conventional digital portable telephone, either the voice signal or the non-voice signal is transmitted using the transmission rate 11.2 kbps, so that one digital portable telephone can transmit only a single type of signal. But, recently, voice signal can be transmitted using just 5.6 kbps, that is, half the rate of the conventional art. Therefore, 5.6 kbps may be used to transmit the voice signal, while the remaining 5.6 kbps may be used to transmit the non-voice signal. The digital portable telephone transmits a signal per 20 msec, so that multiplex transmission apparatus 10 alternately transmits the voice signal and the non-voice signal at an interval of 20 msec, for example.

Digital portable telephone 22 supplies a signal which is received from communications network 30 to multiplex transmission apparatus 20. Multiplex transmission apparatus 20 sorts out the voice signal and the non-voice signal from the supplied signal by checking the error detecting code of the supplied signal. For example, in the case where the non-voice signal is transmitted in a signal format which has been standardized by RCR-27, the error detecting code is added to the transmitted non-voice signal. On the other hand, the voice signal is encoded by a convolutional code method, so that its signal format is different from that of the non-voice signal. Therefore, multiplex transmission apparatus 20 can judge the type of the signal according to the type of the error detecting code, because a different error detecting code is added to each signal. Provided that the type of received signal is determined once, then it is possible to sort out the type of received signal in each receiving timing by judging the receiving timing of each signal subsequently received.

Figure 2:
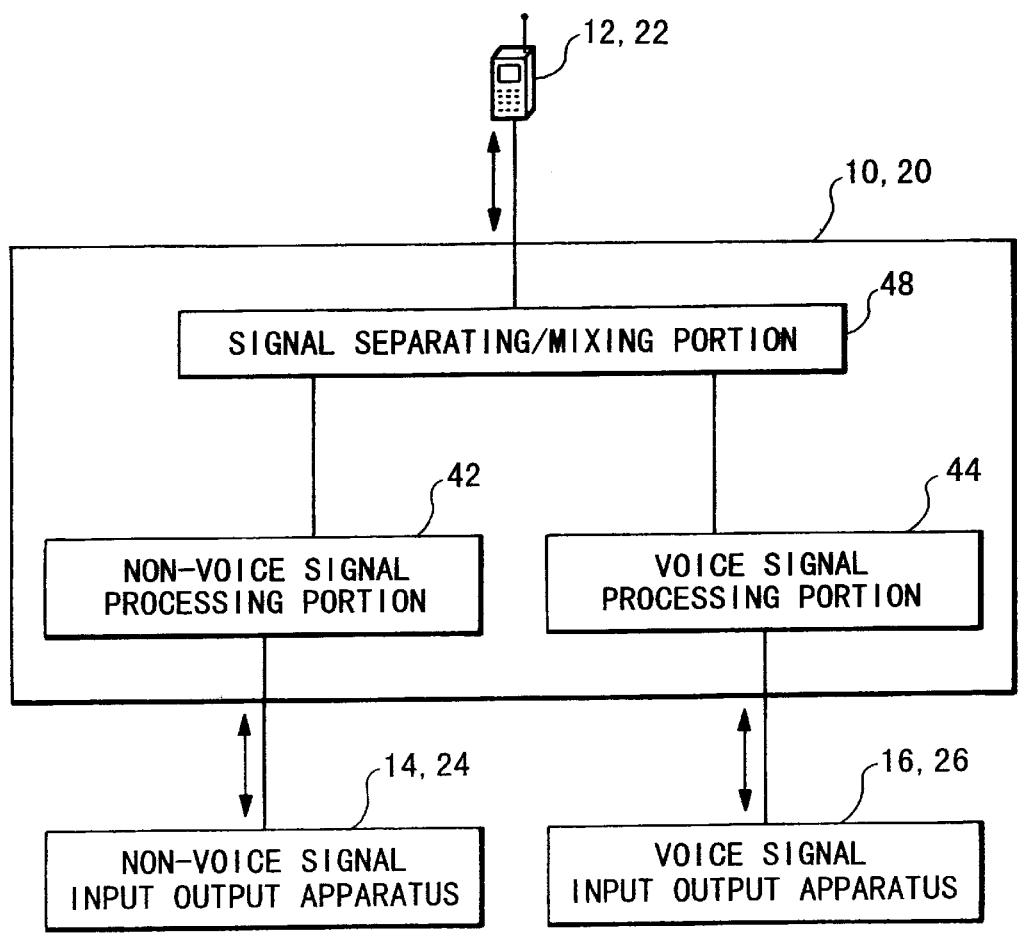
FIG. 2 is a block diagram showing an outline of multiplex transmission apparatuses 10, 20.

FIG. 2 is a functional block diagram of multiplex transmission apparatuses 10, 20. Multiplex transmission apparatuses 10, 20 have a non-voice signal processing portion 42 which processes signals of non-voice input output apparatuses 14, 24, and a voice signal processing portion 44 which processes signals of voice input output apparatuses 16, 26. Furthermore, signal separating/mixing portion 48 separates the received signal from communications network 30, and mixes the received signals from non-voice signal processing portion 42 and voice signal processing portion 44.

Figure 3:
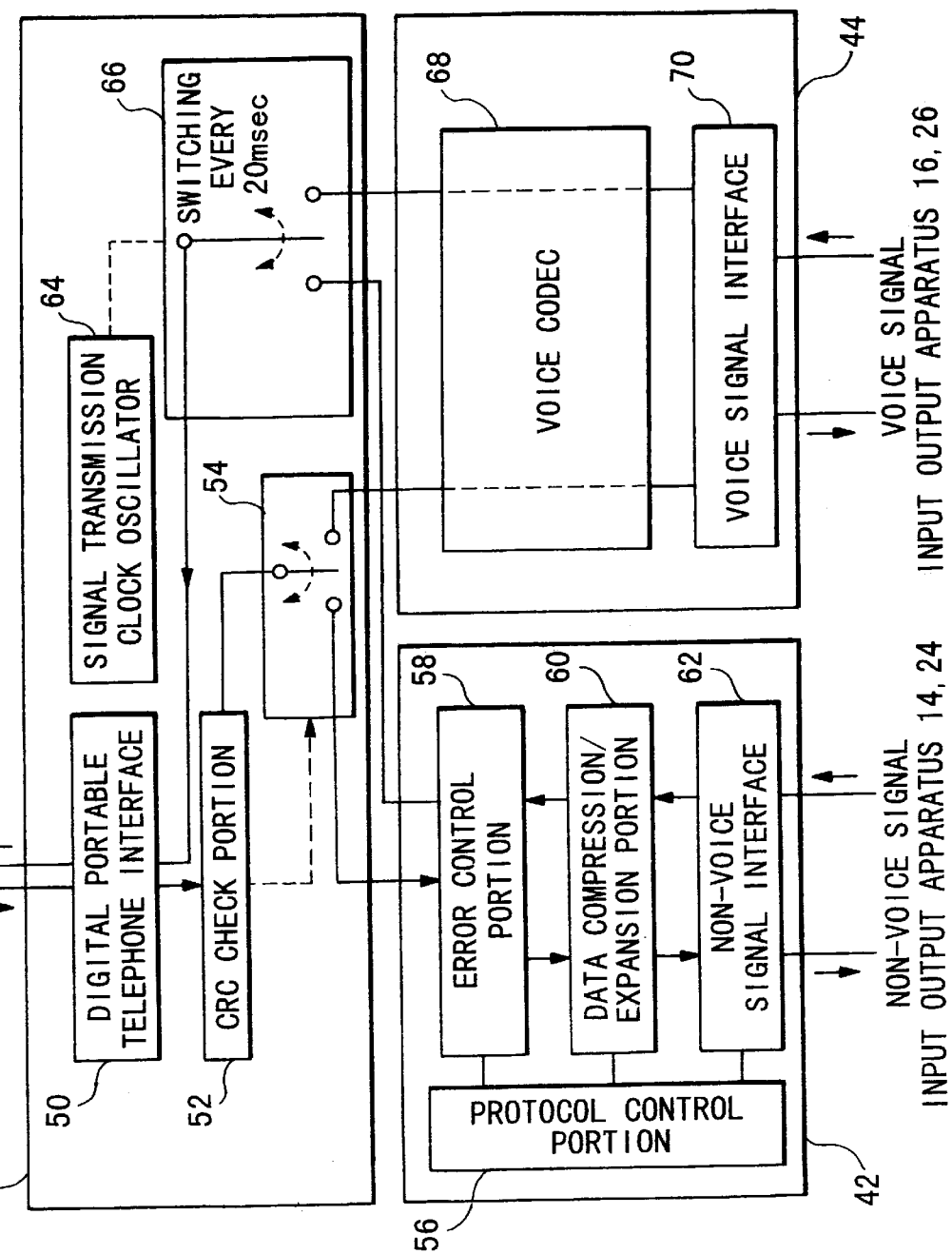
FIG. 3 is a block diagram showing the detail of multiplex transmission apparatuses 10, 20.

FIG. 3 is a block diagram showing the internal structure of multiplex transmission apparatuses 10, 20. In FIG. 3, digital portable telephone interface 50 supplies received signals from digital portable telephones 12, 22 to CRC check portion 52. When multiplex transmission is carried out, portable telephones 12, 22 do not use their own voice CODEC, but use the voice CODEC 68 which is provided in multiplex transmission apparatuses 10, 20. The voice signal and the non-voice signal are alternately supplied to CRC check portion 52 at an interval of 20 msec. CRC check portion 52 judges that a slot in which the result of the CRC check is "OK" is a non-voice signal.

Separating switch 54 supplies the received signal to non-voice signal processing portion 42 or voice signal processing portion 44 based on the result of the CRC check. Protocol control portion 56 controls errors by means of an error control portion 58, and compresses or expands data by means of data compression/expansion portion 60. Non-voice signal interface 62 interfaces with non-voice signal input output apparatuses 14, 24. Voice CODEC 68 encodes or decodes the voice signal. Voice signal interface 70 interfaces with voice signal input output apparatuses 16, 26. Switching apparatus 66 supplies the received signal from non-voice signal processing portion 16, or the received signal from voice signal processing portion 44, by switching these signals every 20 msec, to digital portable telephone interface 50. Signal transmission clock oscillator 64 generates a clock for data transmission.

Figure 4:
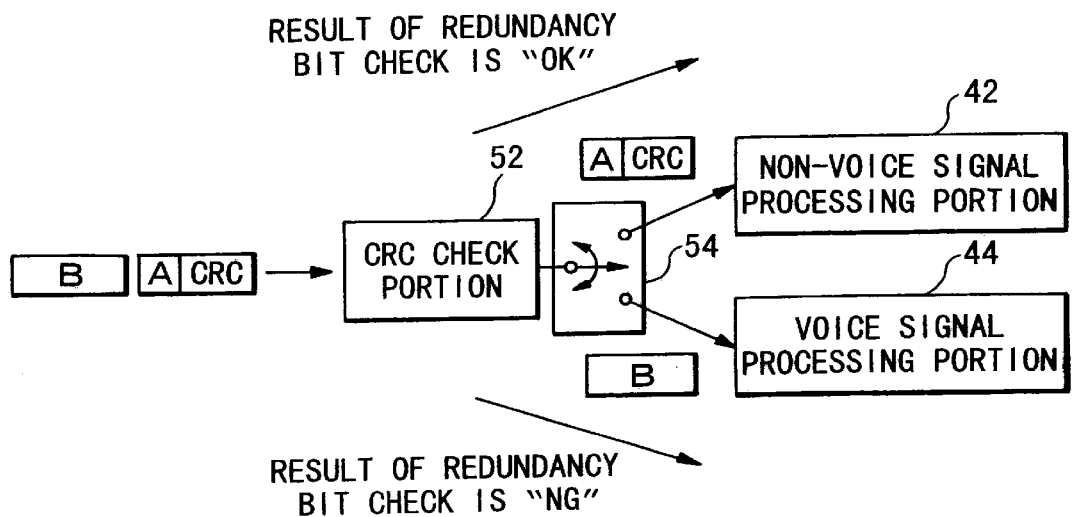
FIG. 4 is a conceptual diagram showing an example of a signal separation method.

FIG. 4 is a conceptual diagram showing the sorting method for two different types of received signals at CRC check portion 52. A difference error detecting code is added to each signal respectively. The type of received signal is recognized by checking the kind of error detecting method.

Figure 5:
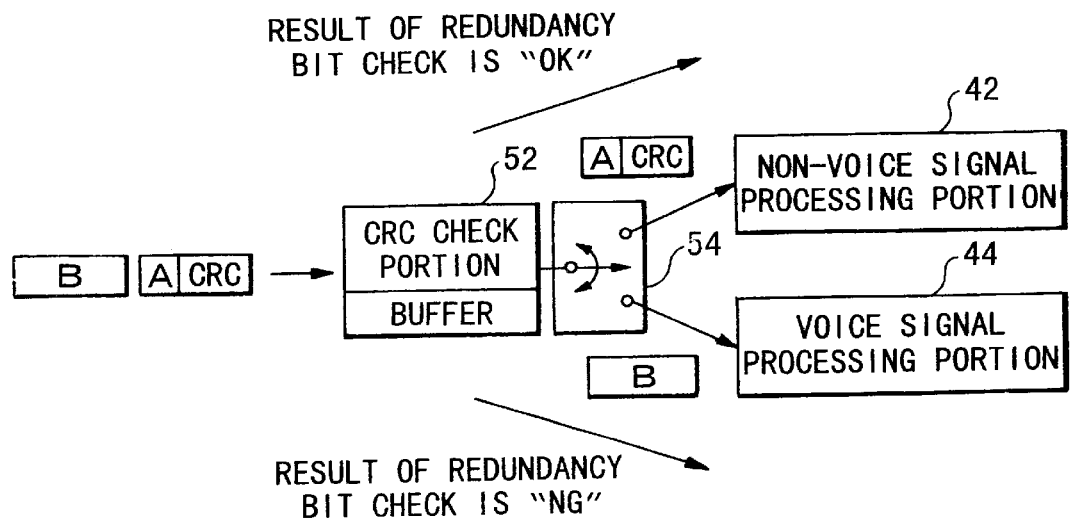
FIG. 5 is a conceptual diagram showing another example of a signal separation method.

FIG. 5 is a conceptual diagram showing another sorting method for two signals. In FIG. 5, a slot in which the result of CRC check is "NG" is not necessarily a voice signal, because even if the received signal is a non-voice signal, the result of CRC check can be NG. So CRC check portion 52 stores data of slots until a slot is received in which the result of the CRC check of the error detecting code becomes "OK". In the case where the result of CRC check for the Nth slot is "OK", it is understood that the slots of the N-2th, the N-4th, . . . are also non-voice signals, so that it is possible to supply the signals to the appropriate circuit. Furthermore, it is understood in advance that the slots of the N+2th, the N+4th, . . . are non-voice signals, so that it is not necessary to determine the type of signals. Instead, the signal types are sorted out on the basis of the signal arrival timing.

Figure 6:
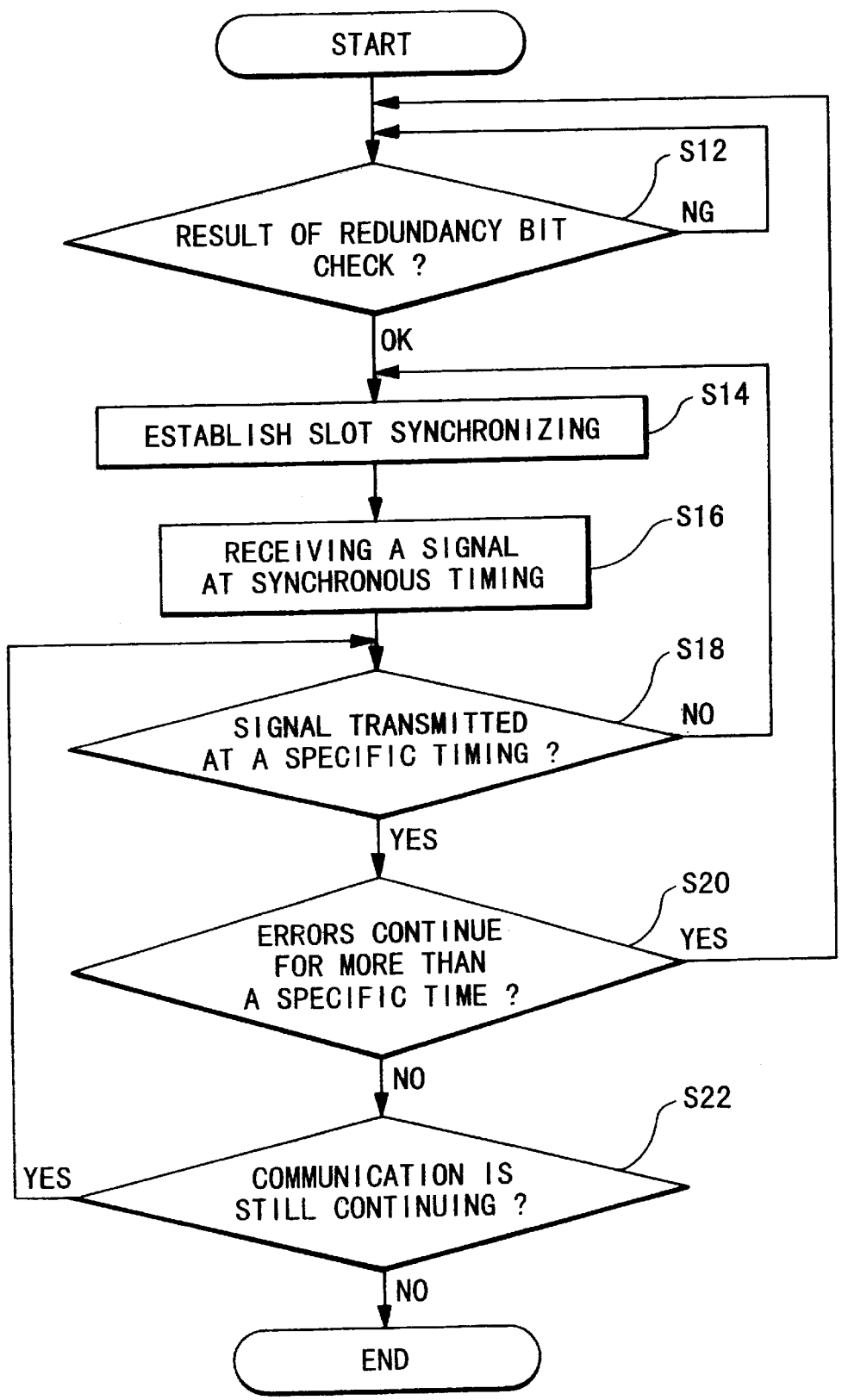
FIG. 6 is a flowchart showing a procedure of multiplex transmission apparatus 20 at the receiving side.

FIG. 6 is a flowchart showing the procedure for signal sorting by CRC check portion 52 in the signal sorting process. CRC check portion 52 first checks the redundancy bit of CRC code, etc., (S12), and synchronizes with the slot if the result of the check is "OK" (S14). Next, CRC check portion 52 receives a signal at the synchronous timing (S16), and confirms whether the signal is transmitted at a specific timing or not (S18). If the signal is not received at a specific timing, the procedure returns to step S14, and synchronizes with the slot. In step S18, the signal is received at the specific timing, and CRC check portion 52 judges whether the errors continue for more than the specific time or not (S20). If the errors continue longer than the specific time, the procedure returns to step S12. On the other hand, if the errors do not continue longer than the specific time, the CRC check portion 52 judges whether the communication is still continuing or not (S22). If the communication is still continuing, the procedure returns to stop S18. On the other hand, if the communication is not continuing, the procedure terminates.

B. Additional Embodiment

The first embodiment treated an example in which one-way communication was carried out. It is, of course, possible to carry out two-way communication by providing transmission means and receiving means on the both sides.

Figure 7:
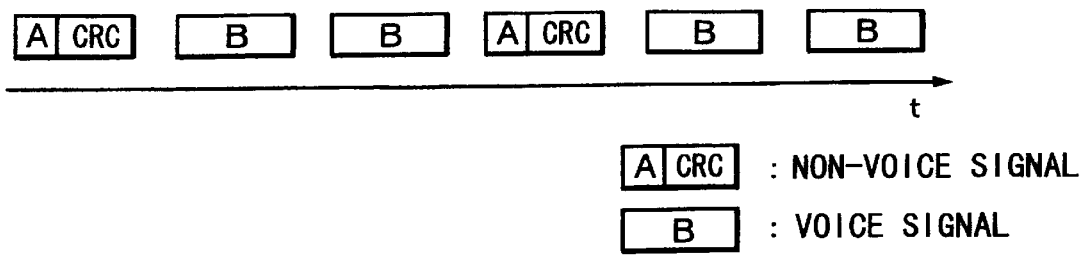
FIG. 7 is a conceptual diagram showing another example of a signal transmission method.

Furthermore, in the first embodiment, the voice signal and the non-voice signal are transmitted alternately. However, it is not absolutely essential to alternately transmit signals of a variety of types. For example, in the case of TDMA communication using three slots, as shown in FIG. 7, the signals may be transmitted repeatedly in order as non-voice signal, voice signal and voice signal. Herein, CRC code is added to the non-voice signal, and an error detecting code is not added to the voice signal. Furthermore, multiplex transmission apparatus 20 on the receiving side is informed in advance of the transmission order of the signals. Multiplex transmission apparatus 20 on the receiving side transfers the various types of signals to non-voice signal processing portion 42 or voice signal processing portion 44 based on the signal transmission order information which was received in advance. Furthermore, as for the communication method may be CDMA communication.

Figure 8:
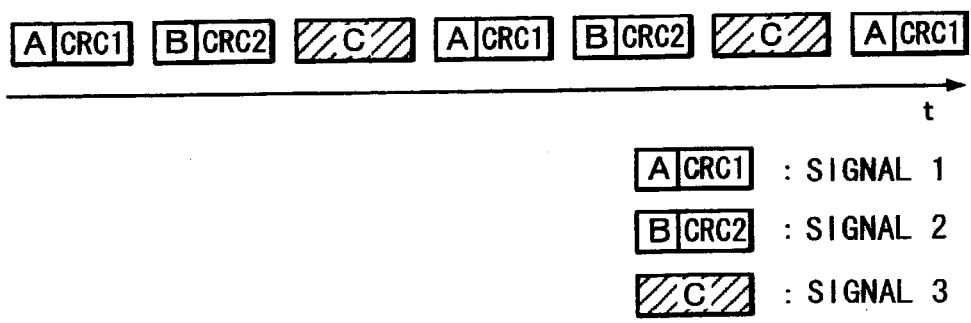
FIG. 8 is a conceptual diagram showing another example of a signal transmission method.
Figure 9:
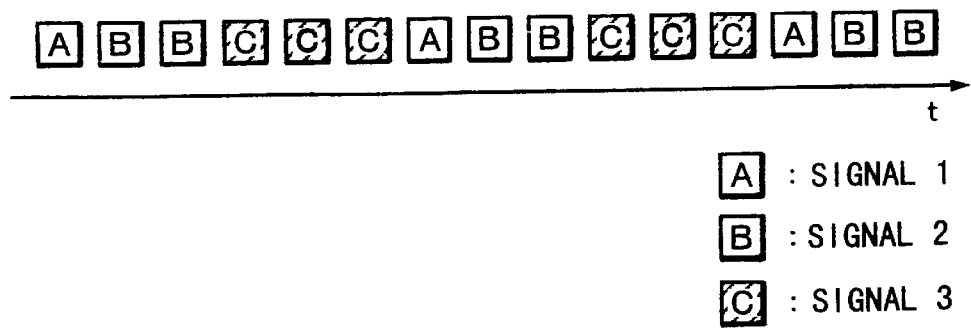
FIG. 9 is a conceptual diagram showing another example of a signal transmission method.

FIGS. 8 and 9 are conceptual diagrams showing an other example of a signal transmission method. In FIG. 8, multiplex transmission apparatus 10 transmits signal 1, signal 2 and signal 3 in order. Furthermore, different types of CRC codes are added to signals 1 and 2 respectively, and no error detecting code is added to signal 3. In FIG. 9, multiplex transmission apparatus 10 adds a redundancy bit, such as a CRC code, to each signal 1, 2 and 3. As shown in FIGS. 7 through 9, it is necessary to add a different type of error detecting code to each signal in all cases. As a result, multiplex transmission apparatus 20 on the receiving side is able to judge the type of signal based on the error detecting code.

This invention may be practiced or embodied in still other ways without departing from the spirit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. A receiving apparatus which receives a signal from a communications network, said receiving apparatus comprising:

a receiving means for receiving said signal from said communications network;

an error control code type judgment means for judging the type of error control code which is added to said signal, a first signal type judgment means for judging the type of said signal on the basis of said error control code, and a second signal type judgment means for judging the type of each signal subsequently received from said communications network on the basis of the receiving timing, which is determined by a receiving timing of said signal in which the type is judged by said first signal type judgment means, of each signal subsequently received.

2. A data communication system which transmits the various types of signals from a transmission apparatus to a receiving apparatus, wherein:

said transmission apparatus comprises:

an adding means for adding an error control code to each of said various types of signals according to the signal type, a first transmission means for transmitting said various types of signals in which said error control code is added, and a second transmission means for transmitting said various types of signals at a predetermined timing, and said receiving apparatus comprises:

a receiving means for receiving said various types of signals, a first signal type judgment means for judging the type of each of said various types of signals according to the error control code which is added to each of said various types of signals, and a second signal type judgment means for judging the type of each signal subsequently received from said communications network on the basis of the receiving timing, which is determined by a receiving timing of said signal in which the type is judged by said first signal type judgment means, of each signal subsequently received.

3. A data receiving method comprising:

a step for receiving signals from a communications network, a step for judging the type of an error control code which is added to said signals, a step for judging the type of each of said signals on the basis of the type of said error control code, and a step for judging the type of each signal subsequently received from said communications network on the basis of the receiving timing of said subsequently received signal.

4. A data communication method which transmits the various types of signals from a transmission apparatus to a receiving apparatus, wherein:

said transmission apparatus comprises:

a step for adding an error control code to each of the various types of signals according to the signal type, a step for transmitting the various types of signals in which said error code is added, and a step for transmitting said various type of signals at predetermined timing, and said receiving apparatus comprises:

a judgment step for judging the type of each signal according to the error control code which is added to each of the various types of signals, and a step for judging the type of each signal subsequently received from said communications network on the basis of the receiving timing, which is determined by a receiving timing of said signal in which the type is judged by said judgment step, of each signal subsequently received.

* * * * *